United States Patent [19]

Jubb

[11] 4,222,367
[45] Sep. 16, 1980

[54] SOLAR HEAT APERTURE CONTROL APPARATUS

[75] Inventor: Albert Jubb, Kenilworth, England

[73] Assignee: Rolls-Royce Limited, London, England

[21] Appl. No.: 952,215

[22] Filed: Oct. 17, 1978

[30] Foreign Application Priority Data

Oct. 18, 1977 [GB] United Kingdom ............... 43239/77

[51] Int. Cl.³ ................................................. F24J 3/02
[52] U.S. Cl. ......................................... 126/419; 49/31
[58] Field of Search ............... 126/418, 419, 422, 424, 126/425; 60/641; 49/31; 236/91 F

[56] References Cited

U.S. PATENT DOCUMENTS

| | | | |
|---|---|---|---|
| 2,030,350 | 2/1936 | Bremser | 126/419 |
| 3,822,692 | 7/1974 | Demarest | 126/422 |
| 3,952,947 | 4/1976 | Saunders | 126/422 |

Primary Examiner—James C. Yeung
Attorney, Agent, or Firm—Cushman, Darby & Cushman

[57] ABSTRACT

A power plant utilizing solar energy as the heat source has a radiant energy heat receiver having a controllable entry aperture for the incoming radiant energy, the aperture being defined by at least three movable shutters, each shutter having a temperature sensing device and operating means which are operable in dependence of the sensed temperature to maintain each shutter in a position corresponding to a predetermined temperature at the entry aperture.

2 Claims, 3 Drawing Figures

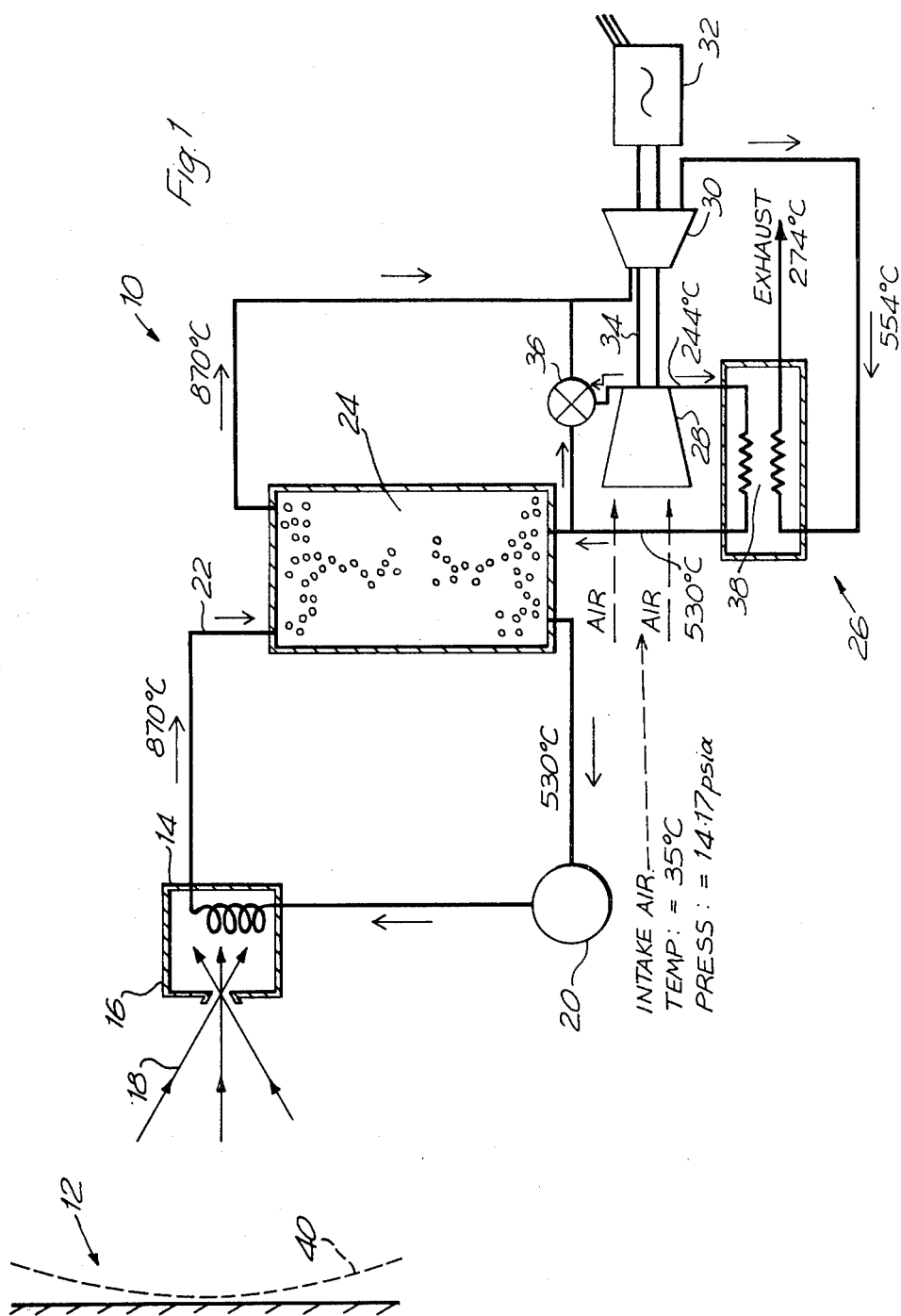

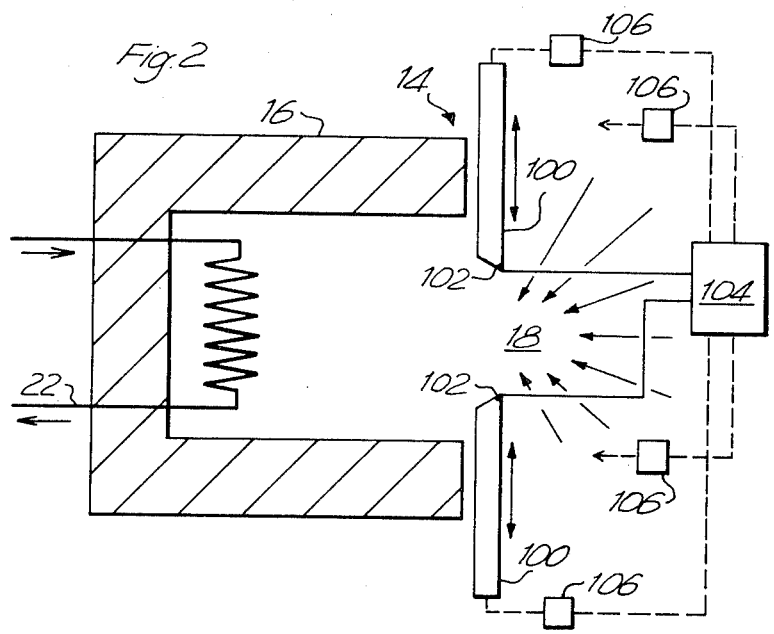
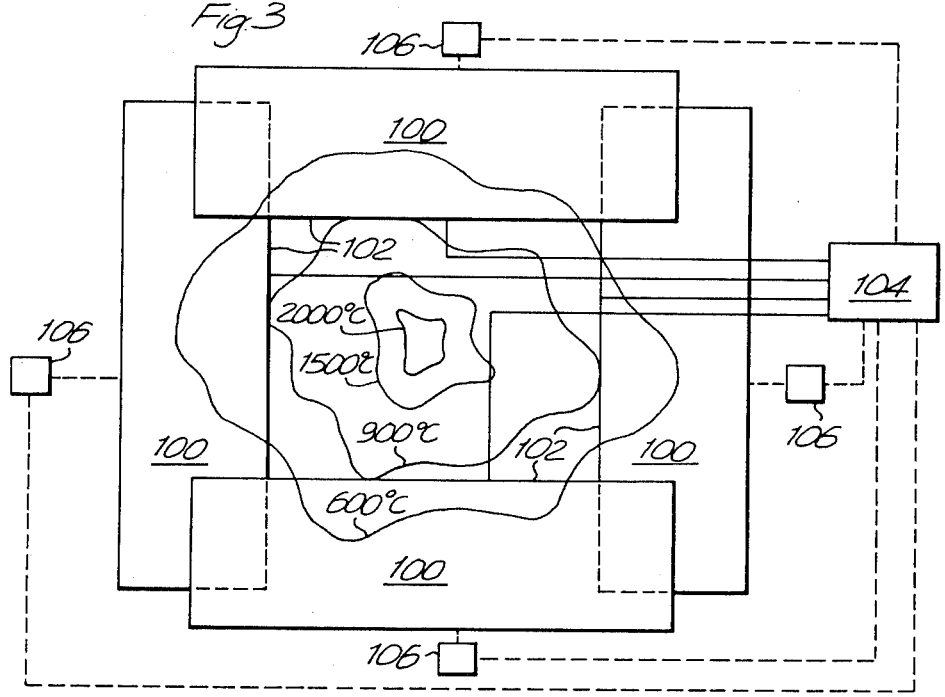

SOLAR HEAT APERTURE CONTROL APPARATUS

This invention relates to apparatus for controlling and varying the size of an aperture in dependence of a sensed physical quantity.

The invention is particularly concerned with controlling and varying the size of the entry aperture of a radiant energy heat receiver which forms part of a solar energy gas turbine engine power plant. The heat receiver in such a power plant may comprise an insulated container, receiving via an entry aperture radiant energy reflected from a mirror field and heat transfer surfaces within the receiver in contact with a heat transfer medium e.g. air.

The entry aperture must be of such a size as to collect sufficient radiant energy without causing excessive temperatures at the entry or allowing re-radiation on a significant scale. Also, because the focus of the radiant energy from the mirror field will be somewhat diffuse, due to optical imperfections of the mirrors, and will move due to such factors as the bending of light rays by hot air refraction, and errors of sun-tracking, the position of the entry aperture must be able to follow such movement, so as to collect maximum useful radiation while not allowing excess re-radiation from an oversized entry aperture.

The present invention therefore provides a radiant energy heat receiver having an entry aperture for the radiant energy, the entry aperture being defined by at least three movable shutters, each said shutter having temperature sensing means and shutter operating means which are operable in dependence of the sensed temperature to maintain each shutter in a position corresponding to a pre-determined temperature at the entry aperture.

The temperature sensing means may comprise a thermocouple on the edge of each shutter, the signal from each thermocouple operating a servo motor via a control device.

The present invention will now be more particularly described with reference to the accompanying drawings in which:

FIG. 1 shows a diagrammatic layout of a solar energy power plant using one form of aperture control apparatus according to the present invention, FIG. 2 shows a diagrammatic side elevation of one form of aperture control apparatus according to the present invention applied to the radiant energy heat receiver of a solar energy power plant, and FIG. 3 shows a diagrammatic front elevation of the aperture control apparatus shown in FIG. 2.

Referring to FIG. 1, a solar energy power plant 10 comprises a mirror field 12, the rays from which are directed onto four interconnected heat receivers and exchangers (FIG. 3) 14 which are enclosed within an insulated container 16 having four apertures 18 for the respective heat receivers. A pump or fan 20 circulates a heat exchange medium e.g. air through a closed loop 22 which includes the heat receivers 14 and a large capacity pressurised heat store 24.

The heat store 24 supplies the heat energy for a gas turbine power plant 26 which comprises a compressor 28, turbine 30 and alternator 32 all mounted on a common shaft 34. A by-pass valve 36 is provided in the compressor delivery line to control the proportion of compressor delivery air flowing through the heat store 24 and a heat exchanger 38 using the turbine exhaust gas used to preheat the compressor delivery air before it passes into the heat store 24.

The mirror field 12 consists of six hundred hexagonal mirrors 40, each mirror being built up from fifty four equilateral triangles, each heat receiver 14 dealing with a quarter of the mirror field. The mirrors 40 are movably supported on a space frame (not shown) and have control means (not shown) so that the mirrors can continuously focus the suns rays into the respective apertures 18 of the heat receivers as the sun traverses the sky.

Referring now to FIGS. 2 and 3, the aperture 18 in the heat receiver 14 is defined by four shutters 100, each of which is movable in slideways (not shown), the shape of the aperture 18 always being rectangular. Each shutter 100 has one or more thermocouples 102 on the edge which defines the aperture 18 and the signal from each thermocouple passes to a control 104. A servo-motor 106 is associated with each shutter to move the shutter either in or out in dependence of the signal from the control 104.

Each shutter is made of a thick insulating material and is covered with an oxidised metal (e.g. a NIMONIC alloy) which gives an emissivity of nearly unity. Movement of the shutters across the aperture will result in the shutter external temperature being controlled by the external radiation falling on it. The shutter edge temperature rises as the shutter intercepts more reflected energy from the mirror field. The thermocouple signal from the edge of the shutter indicating the shutter edge temperature is continuously supplied to the control 104 where it is compared with a reference signal indicative of the desired edge temperature. Thus the relevant servo-motor is operated to move the shutter to a position corresponding to the edge temperature required.

In the present example, the design edge temperature is selected to be 900° C. and the thermocouple, control and servo-motor loop of each shutter control will move the shutters until they define the periphery of the radiant energy field which generates this temperature at the aperture 18. The shutter control then continues to select the useful aperture area whatever its distortion from a nominal base condition.

By using the shutter edge temperature close to that of the interior of the heat receiver, particularly the heat exchange surface of the loop 22, the selected area of the aperture 18 is that which will produce useful heat in the receiver without exposing unnecessary re-radiation area. It is probable in practice, that the selected maximum edge temperature would be just above the heat receiver temperature since any practical shutter array will always have a cooler area between adjacent shutter corners.

The embodiment of the invention described above uses four shutters but any number of shutters can be used, provided there are three or more and the shutters could be mounted in a pivoted manner similar to the leaves which make up the iris of a camera, so any convenient aperture shape from triangle to rectangular to polygons can be used.

I claim:

1. A solar radiant energy heat receiver having a movable entry aperture for receiving focussed radiant energy, said movable entry aperture being varied in size to at least partially define a predetermined temperature profile in a plane of the entry aperture, said movable entry aperture having a periphery defined by at least three independently movable shutters, each of said shutters having an edge forming at least a portion of the periphery of the aperture, temperature sensing means on the edge of each shutter, and shutter operating means operatively connected to each temperature sensing means and operable in dependence on the sense temperature thereof to independently maintain the shutter in a position such that positions of the shutters in combination at least partially define the predetermined temperature profile in the plane of the aperture whereby maximum useful radiation is collected in the receiver without allowing excessive re-radiation.

2. A heat receiver as claimed in claim 1 having four movable shutters, each shutters having at least one thermocouple mounted on an edge of the shutter defining a portion of the periphery of the aperture, control means arranged to receive signals from the thermocouples and to supply control signals to servo-motors which control the position of each shutter.

* * * * *